United States Patent [19]
Smith

[11] Patent Number: 5,949,997
[45] Date of Patent: Sep. 7, 1999

[54] METHOD AND APPARATUS FOR PROGRAMMING A MICROPROCESSOR USING AN ADDRESS DECODE CIRCUIT

[75] Inventor: Gregory James Smith, San Diego, Calif.

[73] Assignee: NCR Corporation, Dayton, Ohio

[21] Appl. No.: 08/778,519

[22] Filed: Jan. 3, 1997

[51] Int. Cl.$^6$ ................................................. A61M 31/00
[52] U.S. Cl. ................................. 395/652; 39/550
[58] Field of Search ........................... 395/652, 375, 395/800, 405, 775, 425, 550, 555; 364/200, 413, 431, 900, 724.16; 365/230.03, 230, 227

[56] References Cited

U.S. PATENT DOCUMENTS

| | | | |
|---|---|---|---|
| 4,255,789 | 3/1981 | Hartford et al. | 364/431 |
| 4,320,386 | 3/1982 | Harris | 340/825.22 |
| 4,679,166 | 7/1987 | Berger et al. | 364/900 |
| 4,809,234 | 2/1989 | Kuwashrio | 365/230 |
| 4,855,903 | 8/1989 | Carleton et al. | 364/200 |
| 4,933,843 | 6/1990 | Scheller et al. | 364/413.01 |
| 4,961,172 | 10/1990 | Shubat et al. | 365/230 |
| 5,051,890 | 9/1991 | Nagasaki et al. | 364/200 |
| 5,263,003 | 11/1993 | Cowles et al. | 365/230.03 |
| 5,293,591 | 3/1994 | Dettmer | 395/375 |
| 5,293,604 | 3/1994 | Kadaira | 395/425 |
| 5,301,347 | 4/1994 | Kensky | 395/800 |
| 5,345,424 | 9/1994 | Landgraf | 365/227 |
| 5,361,365 | 11/1994 | Hirano et al. | 395/775 |
| 5,381,357 | 1/1995 | Wedgwood et al. | 364/724.16 |
| 5,557,782 | 9/1996 | Witkowski | 395/550 |
| 5,729,709 | 3/1998 | Harness | 395/405 |
| 5,751,988 | 5/1998 | Fujimura | 395/405 |

*Primary Examiner*—Hassan Kizou
*Assistant Examiner*—Oanh Phuong Nguyen
*Attorney, Agent, or Firm*—Gates & Cooper

[57] ABSTRACT

A method for programming a microprocessor using first and memory banks, a reset circuit, and an address decode circuit. The first bank of memory contains a current program. The second bank of memory contains an updated program. The microprocessor is initially booted using the current program, and then rebooted using the updated program. During the second reboot using the updated program, the microprocessor performs diagnostics to verify that the updated program is operational and/or error free. If the updated program is operational and/or error free, the updated program is used for future initial boots. If the updated program is not operational and/or error free, the microprocessor reboots using the current program, and a fail signal is generated, so that the updated program can be replaced.

33 Claims, 3 Drawing Sheets

METHOD AND APPARATUS FOR PROGRAMMING A MICROPROCESSOR USING AN ADDRESS DECODE CIRCUIT

BACKGROUND OF THE INVENTION

1. Field of the Invention

This invention relates in general to a method for programming a microprocessor, and more particularly to a method for flash programming an embedded controller.

2. Description of Related Art

Microprocessors used as embedded controllers in high reliability systems must be able to have their programming updated in the field to correct errors and provide new features. This update must be done without adversely effecting the system being controlled and should the programming produce an error, the microprocessor must still continue to operate in a known and proper mode of operation.

Once the new program for the microprocessor has been downloaded, the microprocessor must switch to this new program gracefully, and if the new program does not operate properly, then the microprocessor must be able to recover to a known state with the prior program.

It can be seen then that there is a need for a better method of updating a microprocessor's programming. It can also be seen then that there is a need for a better transition method between a current program and an updated program. It can also be seen that there is a need for a method for returning a microprocessor to a previous program and a known state in a graceful manner when the updated program fails to operate correctly

SUMMARY OF THE INVENTION

To minimize the limitations in the prior art described above, and to minimize other limitations that will become apparent upon reading and understanding the present specification, the present invention discloses a powerful and highly productive method for programming a microprocessor. The present invention solves the above-described problems by using first and second memory banks, a reset circuit, and an address decode circuit. The first bank of memory contains a current program. The second bank of memory contains an updated program. The microprocessor is initially booted using the current program, and then rebooted using the updated program. During the reboot using the updated program, the microprocessor performs diagnostics to verify that the updated program is operational and/or error free. If the updated program is operational and/or error free, the updated program is used for future initial boots. If the updated program is not operational and/or error free, the microprocessor reboots using the current program and a signal is generated, so that the updated program can be replaced.

One object of the present invention is to be able to update a microprocessor's programming in a fail-safe manner. Another object of the present invention is to be able to switch programs for the microprocessor without adversely affecting the system that is controlled by the microprocessor. Still another object of the present invention is to be able to return the microprocessor to a known state if the updated program does not operate as expected.

These and various other advantages and features of novelty which characterize the invention are pointed out with particularity in the claims annexed hereto and forma a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

Figure 1:
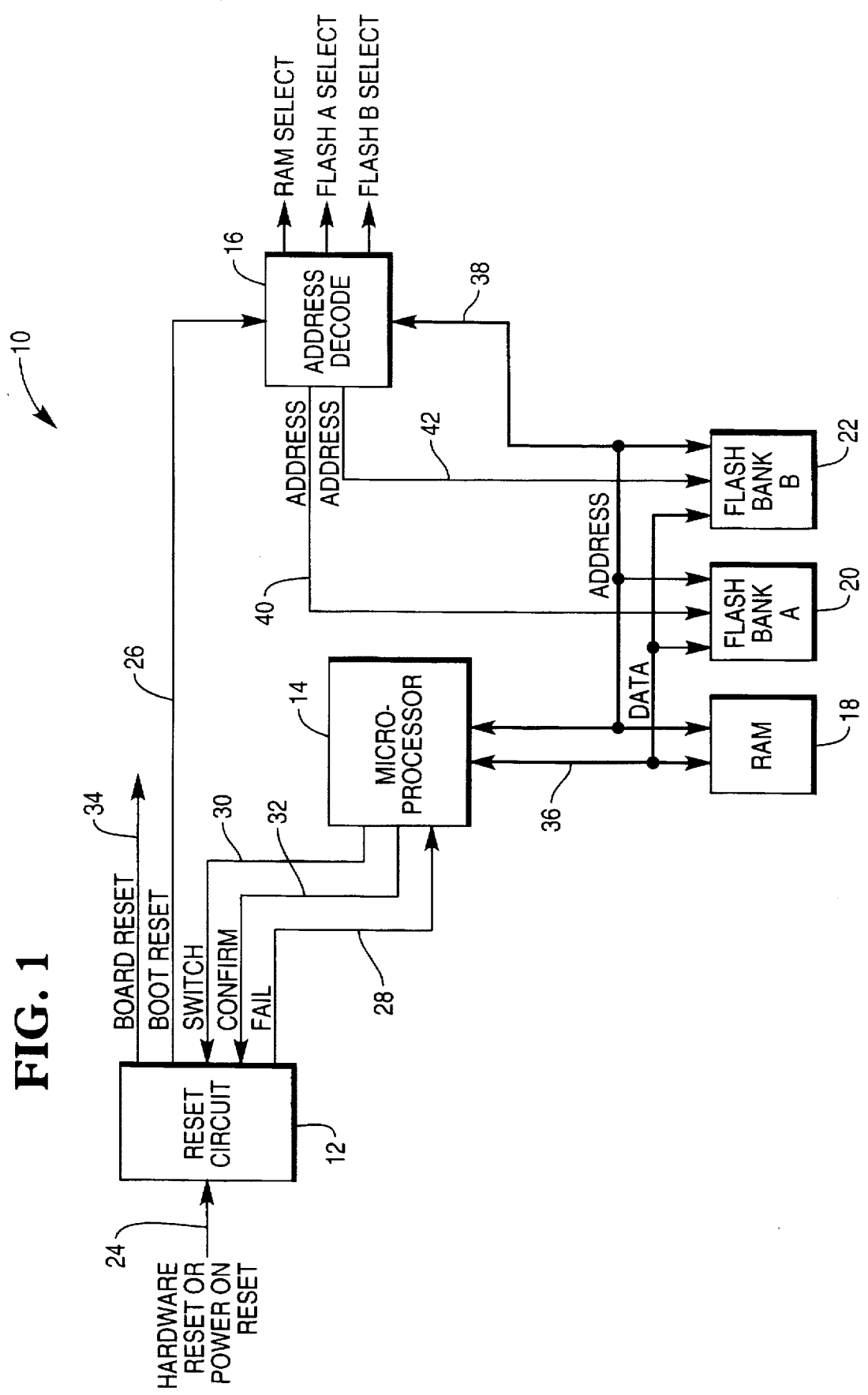
FIG. 1 is a block diagram of a system using the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention provides an improved method for programming a microprocessor. The method involves the use of first and second banks of memory storing a first program or set of instructions (i.e., a current program) and a second program or set of instructions (i.e., an updated program), respectively, and a reset circuit. While the microprocessor is executing the first program from a first bank, the second program is stored in a second bank. Preferably, the second program is received into the system through some type of communications port coupled to the microprocessor (i.e., I²C, EIA-232, etc.).

Once the second program is stored in the second bank, the microprocessor asserts a SWITCH signal to the reset circuit. In response, the reset circuit asserts a RESET signal to the microprocessor, which results in the microprocessor ceasing operations and entering a reset state. While the microprocessor is in the reset state, the reset circuit asserts a BOOT SELECT signal to an address decode circuit, indicating that the second program should be retrieved to boot the microprocessor. Thereafter, the reset circuit clears or de-asserts the RESET signal to the microprocessor, which results in the microprocessor rebooting using the second program.

During the boot sequence following such a switch, the microprocessor executes one or more diagnostic routines. These diagnostic routines may include a checksum of the updated program, as well as functional testing (performing assorted operations of the microprocessor to see if they work). While the microprocessor is performing these tests, a timer within the reset circuit measures a specified period of time beginning from the de-assertion of the RESET signal.

A CONFIRM signal from the microprocessor must be received by the reset circuit before the specified period of time elapses or the reset circuit will re-assert the RESET signal. This CONFIRM signal may be generated by one or more instructions within the second program executed by the microprocessor or by one or more instructions within the diagnostic routines.

If the RESET signal is re-asserted, the microprocessor again ceases operation and enters the reset state. While the microprocessor is in the reset state, the reset circuit again asserts the BOOT SELECT signal to the address decode circuit, indicating that the first program should be retrieved from the first bank to boot the microprocessor. Thereafter, the reset circuit de-asserts the RESET signal to the microprocessor, which results in the microprocessor rebooting using the first program (which is known to be good).

Bank selection for booting the microprocessor is determined by data stored in non-volatile memory (memory that retains information in the absence of power) within the reset circuit itself. Basically, when the system is powered up, the reset circuit begins operation, while holding the rest of the system in a reset state. The reset circuit determines which program, i.e., which bank, to select for the boot sequence. The reset circuit must also check to see if the reset is the result of a hardware reset (e.g., due to selection of an external switch, due to a power-on, etc.) or if the reset is the result of the assertion of a SWITCH signal by the microprocessor.

If the reset is not the result of a SWITCH signal, then the reset circuit selects a program from a default bank as defined in the non-volatile memory for the boot sequence, if the reset is the result of a SWITCH signal, then the reset circuit selects a program from a non-default bank as defined in the non-volatile memory for the boot sequence. Only after the microprocessor has successfully completed the boot sequence and the reset circuit has received a CONFIRM signal from the microprocessor will the reset circuit update the data in its non-volatile memory to identify the non-default bank as the default bank for subsequent resets.

This CONFIRM signal is generally asserted by the microprocessor only after it has successfully completed the specified diagnostic routines. If one or more specified diagnostic routines are not successfully completed, the CONFIRM signal may not be asserted by the microprocessor, which results in the reset circuit re-asserting the RESET signal when the specified period of time measured by the timer has elapsed. Generally, this occurs when the updated program is so badly damaged that the diagnostic routines cannot be executed.

In such an event, the reset circuit asserts a FAIL signal to the microprocessor. Upon successfully rebooting, the microprocessor then knows whether the reset it just experienced was the result of a hardware reset, power-on reset, etc., or whether it was the result of a failed SWITCH signal sequence. Generally, the microprocessor will notify the system user in some way that the SWITCH signal failed. Thereafter, the FAIL signal should be cleared by the reset circuit when another SWITCH signal is asserted.

Hardware Diagram

FIG. 1 is a block diagram of a system 10 using the present invention. The system 10 comprises reset circuit 12, microprocessor 14, address decoder 16, RAM (random access memory) 18, flash memory bank A 20, and flash memory bank B 22. In the preferred embodiment, the microprocessor is a Neuron(™) microprocessor that supports flash programming using built-in library routines and a flash programming control circuit.

The reset circuit 12 is connected to the microprocessor 14 and the address decoder 16. The reset circuit 12 receives a hardware or power-on reset signal 24 from other parts of the system 10 to reset the microprocessor 14. The reset circuit 12 asserts the BOOT SELECT signal 26 to the address decoder 16 to select the programs stored in either bank A 20 or bank B 22 for the boot sequence. The reset circuit 12 also sends a FAIL signal 28 to the microprocessor 14 when a boot sequence fails to complete successfully.

The reset circuit receives a SWITCH signal 30 and CONFIRM signal 32 from the microprocessor 14. The SWITCH signal 30 instructs the reset circuit 12 to assert a BOOT SELECT signal 28 to the address decoder 16 to switch the boot sequence from the default bank to the non-default bank, e.g., flash memory bank A 20 to flash memory bank B 22, or vice versa, depending on which bank 20 or 22 is the default. The CONFIRM signal 32 is sent to the reset circuit 12 if the boot sequence is successful. The reset circuit 12 then updates the data in its non-volatile memory to identify the current non-default bank as the default bank for future boot sequences.

During the boot sequence, the reset circuit 12 holds the remainder of the system 10 in a reset mode by asserting the SYSTEM RESET signal 34. Once the boot sequence is successfully completed, the reset circuit 12 can allow the remainder of the system 10 to being operating by de-asserting or clearing the SYSTEM RESET signal 34.

The microprocessor 14 is also coupled to the RAM 18, flash memory bank A 20, and flash memory bank B 22 through data bus 36 and address bus 38. The microprocessor is also coupled to the address decoder 16 through the address bus 38. The data bus 36 allows data to be sent back and forth from microprocessor 14 to RAM 18, flash memory bank A 20, and flash memory bank B 22. The address bus 38 allows the address decoder 16 to send and receive information from the microprocessor 14 and the RAM 18, flash memory bank A 20, and flash memory bank B 22.

The address decoder 16 is further coupled to flash memory bank A 20 via address line 40 and to flash memory bank B 22 through address line 42. These address lines 40–42 allow the address decoder 16 to send information only to one flash memory bank without sending it to the other.

State Diagrams

Figure 2:
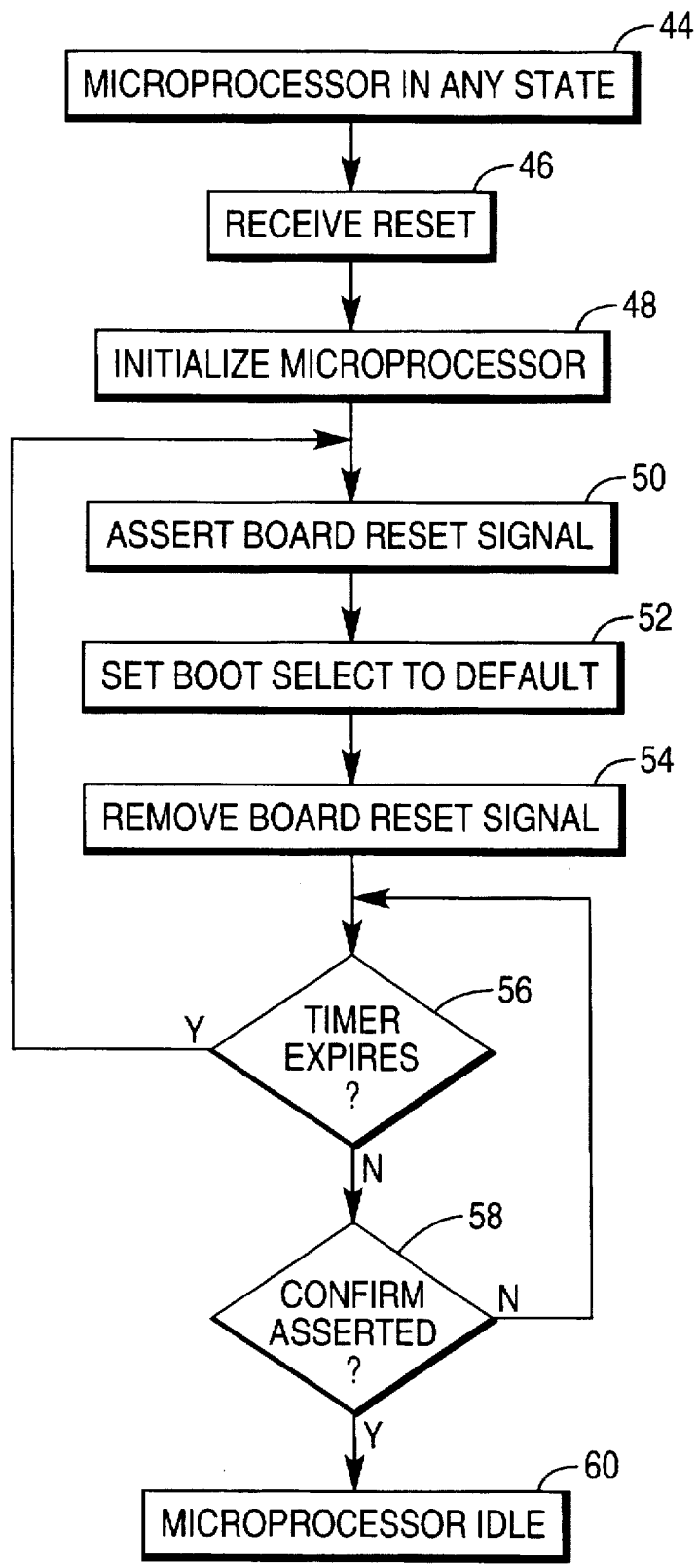
FIG. 2 is a state diagram describing the steps used in booting a microprocessor according to the present invention.

FIG. 2 is a state diagram describing the steps used in booting a microprocessor.

Block 44 represents the microprocessor 14 being in a certain state, e.g., powered off, running a program, or idle.

Block 46 represents the reset circuit 12 receiving a hardware reset or power on reset signal.

Block 48 represents the system 10 initializing the microprocessor 14.

Block 50 represents the reset circuit 12 asserting the BOARD RESET signal 34.

Block 52 represents the reset circuit 12 setting the BOOT SELECT signal so that the microprocessor performs the boot sequence using the program from the default bank.

Block 54 represents the reset circuit 54 clearing the BOARD RESET signal 34.

Block 56 is a decision block determining whether the timer in the reset circuit 12 has expired. If so, control transfers to block 56; otherwise, control transfers to block 58.

Block 58 is a decision block that determines whether the microprocessor 14 has asserted the CONFIRM signal 32. If not, control is transferred to block 56; otherwise, control transfers to block 60, which represents the microprocessor 14 at idle, waiting for the next command, after successfully completing the boot sequence.

Figure 3:
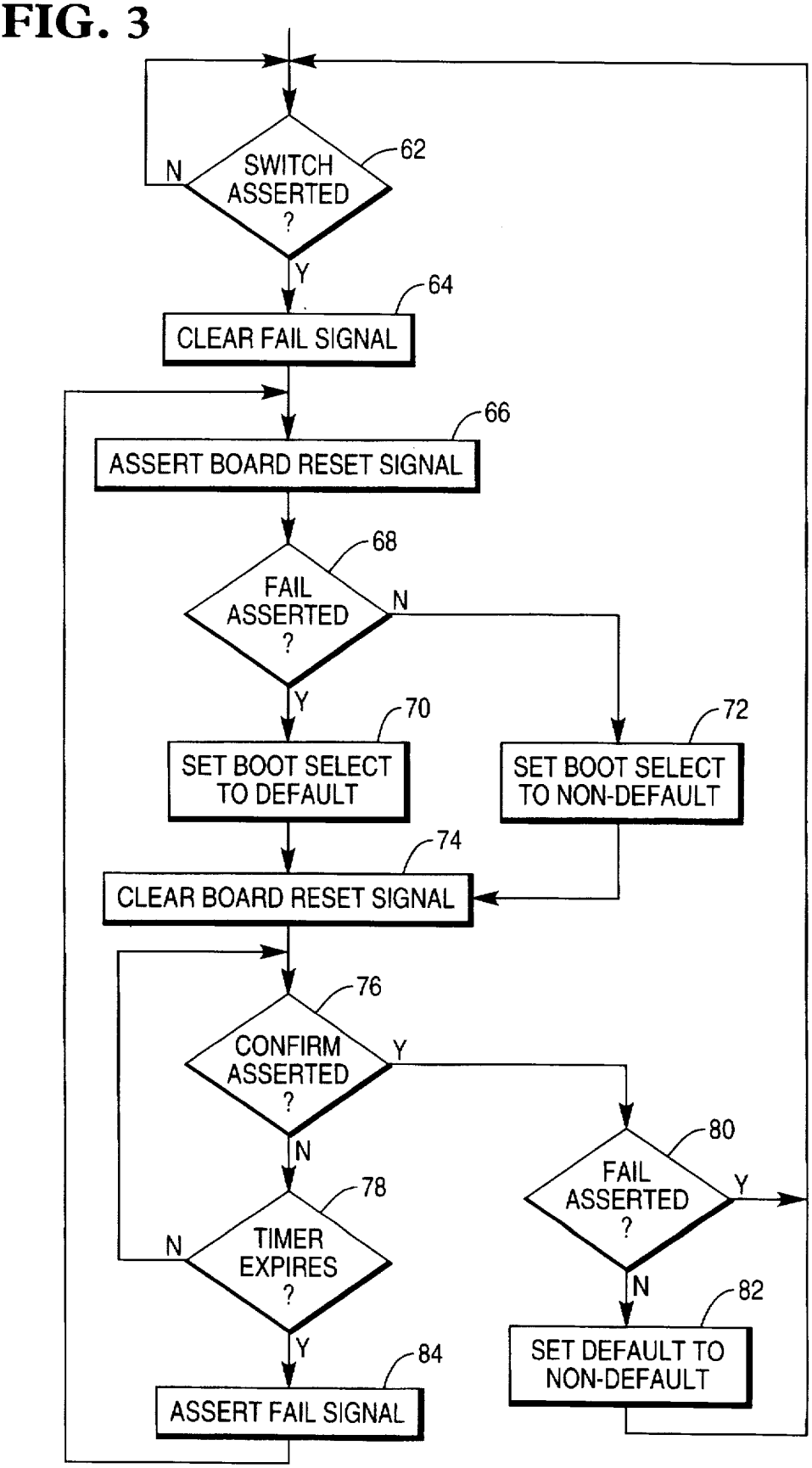
FIG. 3 is a state diagram describing the steps used in rebooting a microprocessor in accordance with the present invention.

FIG. 3 is a state diagram describing the steps used in reprogramming the microprocessor in accordance with the present invention. For ease of understanding, the following explanation will use flash memory bank A 20 as the default memory bank, and flash memory bank B 22 as the non-default memory bank. It is understood that the two memory banks are interchangeable.

Block 62 is a decision block that determines whether the microprocessor 14 has asserted the SWITCH signal 30. If so, control transfers to block 64; otherwise, control transfers to block 62.

Block 64 represents the reset circuit 12 clearing the FAIL signal 28.

Block 66 represents the reset circuit 12 asserting the BOARD RESET signal 34.

Block 68 is a decision block that determines whether the FAIL signal has been asserted by the reset circuit 12. If so, control transfers to block 70; otherwise control transfers to block 72.

Block 70 represents the reset circuit 12 asserting the BLOCK SELECT signal 26 to indicate that the program from the default bank, in this case flash memory bank A 20, should be used in the boot sequence for the microprocessor 14.

Block 72 represents the reset circuit 12 asserting the BLOCK SELECT signal 26 to indicate that the program from the non-default bank, in this case flash memory bank B 22, should be used in the boot sequence for the microprocessor 14.

Block 74 represents the reset circuit 12 removing the BOARD RESET signal 34.

Block 76 is a decision block that determines whether the reset circuit 12 has received the CONFIRM signal 32 from the microprocessor 14. If not, control transfers to block 78; otherwise, control transfers to block 80.

Block 78 is a decision block that determines whether the timer in the reset circuit 12 has elapsed. If not, control transfers to block 76; otherwise, control transfers to block 84.

Block 80 is a decision block that determines whether the reset circuit has asserted the FAIL signal 28. If so, control transfers to block 62; otherwise, control transfers to block 82.

Block 82 represents the reset circuit 12 modifying the data in its non-volatile memory to indicate that the non-default bank is now the default bank.

Block 84 represents the reset circuit 12 asserting a FAIL signal 28 to the microprocessor 14.

Logic flow if switch to non-default memory works properly

If the switch to the flash memory bank B 22 works properly, the logical flow through FIG. 3 will be as described below. The microprocessor 14 asserts the SWITCH signal 30, as represented in block 62. The reset circuit 12 clears the FAIL signal 28, as represented in block 64, and then asserts the BOARD RESET signal 34, as represented in block 66. Decision block 68 transfers control to block 72, since the FAIL signal 28 was cleared in block 64.

The reset circuit 12 asserts BOOT SELECT signal 26 to indicate that the address decoder 16 should use the non-default flash memory bank, in this case, flash memory bank B 22, as represented in block 72.

The reset circuit 12 clears the BOARD RESET signal 34, as represented in block 74.

After the diagnostics complete successfully, the microprocessor 14 asserts the CONFIRM signal 32, as represented in decision block 76. Since the CONFIRM signal is received before the timer in the reset circuit 12 elapses, the microprocessor 14 checks for the presence of the FAIL signal 28, as represented in block 80. However, there is no FAIL signal 28 present, because the FAIL signal 28 was cleared in block 64. Thus, the reset circuit 12 modifies the data in its non-volatile memory to indicate that the default bank is now the non-default, as represented in block 82. Thereafter, control transfers to block 62.

Logic flow if switch is unsuccessful

If the switch to the flash memory bank B 22 does not work properly, the logical flow through FIG. 3 will be as described below. The microprocessor 14 asserts the SWITCH signal 30, as represented in block 62. The reset circuit 12 clears the FAIL signal 28, as represented in block 64, and then asserts the BOARD RESET signal 34, as represented in block 66. Decision block 68 transfers control to block 72, since the FAIL signal 28 is cleared in block 64.

The reset circuit 12 asserts a BOOT SELECT signal 26 to the address decoder 16 that indicates that the program in the non-default bank, in this case, flash memory bank B 22, should be used to boot the microprocessor 14, as represented in block 72.

The reset circuit 12 clears the BOARD RESET signal 34, as represented in block 74.

After the diagnostics are performed, the microprocessor 14 does not assert the CONFIRM signal 32, as represented in decision block 76, because the diagnostics failed. As a result, the CONFIRM signal is not received by the reset circuit 12 before the timer expires, as represented in block 78. The reset circuit 12 asserts the FAIL signal 28, as represented in block 84.

The reset circuit then asserts the BOARD RESET signal 34, as represented in block 66. Decision block 68 transfers control to block 70, since the FAIL signal 28 was asserted in block 84.

The reset circuit 12 asserts the BOOT SELECT signal 26 to the address decoder 16 to indicate that the program in the default flash memory bank, in this case, flash memory bank A 22, should be used to boot the microprocessor 14, as represented in block 70.

The reset circuit 12 then clears the BOARD RESET signal 34, as represented in block 74.

After the diagnostics are performed, the microprocessor 14 asserts the CONFIRM signal 32, as represented in decision block 76, because the boot sequence was successful using the program from the default memory bank, flash memory bank A 20. Since the CONFIRM signal is asserted before the timer in the reset circuit 12 expires, the microprocessor 14 will then check for the presence of the FAIL signal 28, as represented in block 80.

There FAIL signal 28 is present, because it was set in block 84. Thus, the data in the non-volatile memory of the reset circuit will not be modified in block 82, because decision block 80 will bypasses block 82 and transfers control to block 62.

Conclusion

In conclusion, the present invention discloses a method for programming a microprocessor using first and second memory banks, a reset circuit, and an address decode circuit. A first bank of memory contains a current program. A second bank of memory contains an updated program. The microprocessor is initially booted using the current program, and then rebooted using the updated program. During the second reboot using the updated program, the microprocessor performs diagnostics to verify that the updated program is operational and/or error free. If the updated program is operational and/or error free, the updated program is used for future initial boots. If the updated program is not operational and/or error free, the microprocessor reboots using the current program, and a fail signal is generated, so that the updated program can be replaced.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for programming a microprocessor, comprising:

a first memory bank, coupled to the microprocessor, for storing a first set of instructions for the microprocessor;

a second memory bank, coupled to the microprocessor, for storing a second set of instructions for the microprocessor;

an address decode circuit, coupled to the first and second memory banks, for selecting between the first and second memory banks in response to receiving an asserted BOOT SELECT signal, wherein the microprocessor initiates a boot sequence using the set of instructions retrieved from the selected first or second memory bank; and a reset circuit, coupled to the address decode circuit and coupled to the microprocessor for receiving a SWITCH command from the microprocessor, and for asserting the BOOT SELECT signal for the address decode circuit to select between the first and second memory banks upon receipt of the SWITCH command from the microprocessor.

2. The apparatus of claim 1 above, wherein the reset circuit further comprises means for asserting a RESET signal to the microprocessor for halting operations of the microprocessor.

3. The apparatus of claim 2 above, wherein the reset circuit asserts the BOOT SELECT signal to the address decode circuit after the RESET signal has been asserted, so that the microprocessor ceases operations while the selection between the first and second memory banks is being made.

4. The apparatus of claim 3 above, wherein the reset circuit further comprises means for clearing the RESET signal to the microprocessor after the selection between the first and second memory banks has been made, thereby resulting in the microprocessor executing a boot sequence using the set of instructions from the selected first or second memory banks.

5. The apparatus of claim 4 above, wherein the microprocessor executes one or more diagnostic routines following the execution of the boot sequence.

6. The apparatus of claim 5 above, wherein a timer within the reset circuit measures a specified period of time beginning from the clearing of the RESET signal while the microprocessor is executing the diagnostics.

7. The apparatus of claim 6 above, wherein the reset circuit re-asserts the RESET signal when a CONFIRM signal is not asserted by the microprocessor before the specified period of time elapses.

8. The apparatus of claim 7 above, wherein the CONFIRM signal is asserted in response to one or more instructions within the set of instructions being executed by the microprocessor.

9. The apparatus of claim 7 above, wherein the CONFIRM signal is asserted in response to one or more instructions within the diagnostics performed by the microprocessor.

10. The apparatus of claim 7 above, wherein the microprocessor again ceases operation and the reset circuit again asserts the BOOT SELECT signal to the address decode circuit when the RESET signal is re-asserted, thereby indicating that a default selection between the first and second memory banks should be made.

11. The apparatus of claim 7 above, wherein the reset circuit asserts a FAIL signal to the microprocessor after the specified period of time measured by the timer has elapsed without the assertion of the CONFIRM signal.

12. The apparatus of claim 11 above, wherein the reset circuit comprises means for clearing the FAIL signal when the SWITCH signal is re-asserted by the microprocessor.

13. The method of claim 11 above, further comprising the step of clearing the FAIL signal when the SWITCH signal is re-asserted by the microprocessor.

14. The apparatus of claim 1 above, wherein one of the first and second memory banks is identified as a default memory bank and the other of the first and second memory banks is identified as a non-default memory bank, and the microprocessor further comprises means for asserting a SWITCH signal to the reset circuit to initiate a selection of the non-default memory bank.

15. The apparatus of claim 14 above, wherein the reset circuit comprises memory for storing an identifier for the default one of the first and second memory banks.

16. The apparatus of claim 14 above, wherein the BOOT SELECT signal asserted by the reset circuit indicates that the default one of the first and second memory banks should be selected.

17. The apparatus of claim 14 above, further comprising means for updating the memory of the reset circuit after a CONFIRM signal has been asserted by the microprocessor.

18. A method for programming a processor having first and second memory banks, comprising the steps of:

storing a first set of instructions into the first memory bank;

programming the processor using the first set of instructions in the first memory bank;

storing a second set of instructions into the second memory bank;

programming the processor using the second set of instructions in the memory of the processor during a reset operation initiated by the microprocessor;

executing one or more, diagnostics after programming the processor using the second set of instructions; and re-programming the processor with the first set of instructions when the executed diagnostics fail.

19. A method for programming a microprocessor, comprising the steps of:

storing a first set of instructions for the microprocessor in a first memory bank coupled to the microprocessor;

storing a second set of instructions for the microprocessor in a second memory bank coupled to the microprocessor;

selecting between the first and second memory banks in response to an asserted BOOT SELECT signal, the BOOT SELECT signal activated by a SWITCH signal generated by the microprocessor; and initiating a boot sequence in the microprocessor using the set of instructions retrieved from the selected memory bank.

20. The method of claim 19 above, further comprising the step of asserting a RESET signal to the microprocessor for halting operations of the microprocessor.

21. The method of claim 20 above, wherein the BOOT SELECT signal is asserted after the RESET signal has been asserted, so that the microprocessor ceases operations while the selection step is being performed.

22. The method of claim 21 above, further comprising the step of clearing the RESET signal to the microprocessor after the selection step.

23. The method of claim 22 above, further comprising the step of executing one or more diagnostic routines following the execution of the boot sequence.

24. The method of claim 22 above, further comprising the step of measuring a specified period of time beginning from the clearing of the RESET signal while the microprocessor is executing the diagnostics.

25. The method of claim 24 above, further comprising the step of re-asserting the RESET signal when a CONFIRM signal is not asserted by the microprocessor before the specified period of time elapses.

26. The method of claim 25 above, wherein the CONFIRM signal is asserted in response to one or more instructions within the set of instructions being executed by the microprocessor.

27. The method of claim 25 above, wherein the CONFIRM signal is asserted in response to one or more instructions within the diagnostics performed by the microprocessor.

28. The method of claim 25 above, further comprising the step of indicating that a default memory bank has been indicated, the step of indicating comprising the steps of:

ceasing operation of the microprocessor;

re-asserting the BOOT SELECT signal; and re-asserting the RESET signal when the BOOT SELECT signal is re-asserted.

29. The method of claim 25 above, further comprising the step of asserting a FAIL signal to the microprocessor after the specified period of time measured by the timer has elapsed without the assertion of the CONFIRM signal.

30. The method of claim 20 above, wherein one of the first and second memory banks is identified as a default memory bank and the other of the first and second memory banks is identified as a non-default memory bank.

31. The method of claim 30 above, further comprising the step of storing an identifier for the default one of the first and second memory banks.

32. The method of claim 30 above, wherein the BOOT SELECT signal indicates that the default one of the first and second memory banks should be selected.

33. The method of claim 30 above, further comprising the step of asserting a CONFIRM signal to change the identification of the default memory bank.

* * * * *